United States Patent [19]

Lipinski et al.

[11] 3,922,345

[45] Nov. 25, 1975

[54] PYRIMIDINONES AND HYDROXY PYRIMIDINES

[75] Inventors: Christopher A. Lipinski, Groton; John G. Stam, Lyme, both of Conn.; Gerald G. DeAngelis, Rolling Hills Estates, Calif.; Hans-Jurgen E. Hess, Old Lyme, Conn.

[73] Assignee: Pfizer Inc., New York, N.Y.

[22] Filed: Feb. 11, 1974

[21] Appl. No.: 440,975

Related U.S. Application Data

[63] Continuation-in-part of Ser. No. 194,006, Oct. 29, 1971.

[52] U.S. Cl. .............................. 424/251; 260/251 R
[51] Int. Cl.² ................. A61K 31/525; A01N 9/22

[58] Field of Search ................................. 260/251 R

[56] References Cited
UNITED STATES PATENTS

| 3,538,094 | 11/1970 | Petersen | 260/251 |
| 3,551,425 | 12/1970 | Petersen | 260/251 |

*Primary Examiner*—Elbert L. Roberts
*Attorney, Agent, or Firm*—Connolly and Hutz

[57] ABSTRACT

Pyrimidinones having bronchodilator and anti-ulcer activities. Preferred embodiments are 5-(m-methylphenoxy)-2-(1H)pyrimidinone, 5-(p-methylphenoxy)-2-(1H)-pyrimidinone, and 5-phenoxy-2-(1H)-pyrimidinone.

5 Claims, No Drawings

PYRIMIDINONES AND HYDROXY PYRIMIDINES

CROSS REFERENCE TO RELATED APPLICATIONS

This application is a continuation-in-part of our copending application Ser. No. 194,006, filed Oct. 29, 1971.

BACKGROUND OF THE INVENTION

This invention is concerned with novel pyrimidinones useful as both bronchodilators and anti-ulcer agents.

Bronchodilator drugs are used to reverse or decrease generalized peripheral airway obstruction that occurs in bronchial asthma and chronic non-specific obstructive lung disease. Two main types of drugs are presently used — sympathomimetic compounds and adenosine 3',5'-monophosphate (cyclic AMP) phosphodiesterase (PDE) inhibitors. The former are characterized by an extremely high potency but they lack specificity for pulmonary tissue and, in addition, they possess cardiovascular side effects which limit their usefulness. Recent reports have suggested that overusage of commercially available sympathomimetic bronchodilators, especially isoprenaline, has led to an increase in patient mortality (Speizer et al., Brit. Med. J. 1:339, 1968). The second type, the cyclic AMP PDE inhibitors, are typified by theophylline and a number of its derivatives.

The novel compounds of this invention differ from other nonsympathomimetics principally in two ways: (1) they are cyclic GMP (guanosine 3',5'-monophosphate), rather than cyclic AMP phosphodiesterase inhibitors; (2) they are considerably more potent and efficacious in conscious guinea pigs.

The novel pyrimidinones of this invention further are useful in treating peptic ulcer and other conditions caused or exacerbated by gustric hyperacidity.

SUMMARY OF THE INVENTION

This invention comprises novel compounds of the formula:

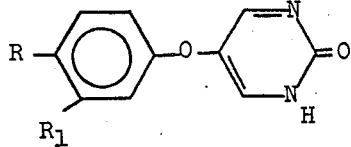

and pharmaceutically acceptable salts thereof wherein:

R and $R_1$ are each hydrogen or methyl with the proviso that at least one of R or $R_1$ be hydrogen. Preferred embodiments of this series of compounds are:
5-(m-methylphenoxy)-2-(1H) pyrimidinone;
5-(p-methylphenoxy)-2-(1H)pyrimidinone; and
5-phenoxy-2-(1H)pyrimidinone.

Further, this invention comprises the method of treating peptic ulcer which comprises administering to an afflicted subject an effective amount of a compound of the formula above.

DETAILED DESCRIPTION OF THE INVENTION

For the preparation of the series of novel pyrimidinones of the present invention, the starting materials used are commercially available substances such as phenol or substituted phenol (p-cresol, for example) and chloroacetaldehyde diethyl acetal. The phenol is first condensed with potassium hydroxide to form a potassium phenolate. This phenolate is further condensed with the above mentioned acetal to form a phenoxyacetaldehyde diethyl acetal such as p-methylphenoxyacetaldehyde diethyl acetal. This acetal is purified, for example, with ether extraction and sodium hydroxide washes and is then dried.

The dried product is slowly added to a reagent prepared by reacting N,N-dimethylformamide (DMF) with phosphorus oxychloride with gentle heat. The reactants are heated for several hours or overnight on a steam bath. The product, a 2-phenoxy-3-dimethylamino acrolein, is purified by standard means such as crystallization from a solvent such as ethyl alcohol or acetone.

The acrolein so produced is added to a reagent prepared by reacting ethanol, sodium pellets, and urea and the entire mixture is heated at reflux temperature for from 24 to 48 hours. The desired product, a 5-phenoxy-2(1H)pyrimidinone such as 5-(p-methylphenoxy)-2-(1H)pyrimidinone, is obtained when the mixture is acidified and crystallized with a solvent such as acetic acid-benzene.

Those skilled in the art will realize that the novel compounds of this invention can exist in either the keto or enol forms and it is to be understood that we include both forms in the claims and disclosure in the present case, and that both forms fall within the scope of the present invention.

Pharmaceutically-acceptable acid-addition salts of the compounds of the invention can be prepared from acids which form non-toxic addition salts containing pharmaceutically-acceptable anions, such as the hydrochloride, hydrobromide, hydroiodide, sulfate or bisulfate, or acid phosphate, saccharate, and p-toluene sulfonate salts.

Furthermore, also included in the present invention are the pharmaceutically acceptable non-toxic metal salts such as the sodium, calcium and potassium salts; and ammonium and substituted ammonium salts.

For the evaluation of the usefulness of the pyrimidinones of this invention as agents for producing bronchial dilatation, the known smooth muscle relaxant and bronchial dilator theophylline was used as the standard for comparison. The two drugs were dissolved in water or suspended in appropriate medium and administered orally to conscious guinea pigs by gavage. One hour after drug administration each animal was exposed to an aerosol of histamine hydrochloride. The respiratory status was evaluated at the end of one minute.

The compounds of the present invention exhibit activity comparable to and even substantially greater than the well known drug theophylline in this guinea pig test. Accordingly, it can be reasonably expected that they will be effective in man.

The compounds of this invention will preferably be administered orally in the form of tablets or capsules, using suitable excipients, or as aqueous suspensions using suitable diluents and emulsifying or suspending agents as desired. Other dosage forms for parenteral or inhalation therapy are also acceptable.

The dosages used will, of course, vary with the age and conditions of the patient and will best be determined by the physician. A general dosage range of from about 0.20 to 7 mg. drug per kg. body weight given three times a day would be typical although higher or lower dosages may be preferred for individual cases.

For the evaluation of the usefulness of the pyrimidinones of this invention as anti-ulcer agents, the well known Shay rat preparation was used. The results of this test are presented as mean values of acid output ($\mu$Eq H$^+$/100 g/4 hr) ± one standard deviation, and the differences between the means of the control and treated groups are analyzed using the unpaired t-test. In addition, the protective effect of these compounds against stress-induced ulceration was determined in immobilized rats.

Atropine and other well known anticholinergic agents used in the treatment of gastric hyperacidity reduce total acid output in the Shay rat preparation. Carbenoxolone sodium, a mechanistically different type of antiulcer agent, inhibits ulceration in the immobilized stressed rat preparation. Accordingly, the compounds of the present invention can be reasonably expected to be effective in man.

The compounds of the invention when used as anitulcer agents can be administered alone, but will generally be administered in admixture with a pharmaceutical carrier selected with regard to the intended route of administration and standard pharmaceutical practice. For example, they may be administered orally in the form of tablets containing such excipients as starch and lactose, or in capsules either alone or in admixture with excipients, or in the form of elixirs or suspensions containing flavoring or coloring agents. They may be injected parenterally, for example, intramuscularly or subcutaneously. For parenteral administration, they are best used in the form of a sterile aqueous solution which may contain other solutes, for example, enough salts or glucose to make the solution isotonic.

With respect to dosage levels, a broad dosage range of 10 to 1000 mg/day for adults will be appropriate, a particularly preferred range being from 25 to 250 mg/day. The physician in any event will determine the actual dosage which will be most suitable for an individual patient and it will vary with age, weight and response of the particular patient. The above dosages are exemplary of the average host. There can, of course, be individual cases where higher or lower dosage ranges are merited, and such are within the scope of this invention.

The following examples are illustrative and in no way limit the scope of the appended claims.

EXAMPLE I

Step A

Into a 3 l 3-neck flask equipped with a press comp dropping funnel, O-head stirrer, and condenser with solvent takeoff was added 112.2 g (2.0 m) KOH pellets. The dry flask was heated and to the stirred hot KOH pellets was added 257.0 g (2.0 m) of molten p-chlorophenol (MP 43°–45°). The flask is maintained at such a temperature that the contents are at 90°–100° so that the phenolate anion does not precipitate and a clear solution of molten potassium p-chlorophenolate + water results.

To the stirred molten solution 600 g. of chloroacetaldehyde diethyl acetal is added (bp. 152°–6°) at such a rate that the mixture remains at 90° to 100°. The mixture (two phases) is stirred rapidly and heated and an azeotrope of the acetal and water is removed via the takeoff on the condenser. Distillation is continued until the distilling vapor is at 140° to 150°. On cooling the azeotrope separates into an aqueous and acetal layer and the acetal can be re-added to the reaction mixture. The mixture is stirred vigorously and heated for 6 hours (or overnight) during which time solid potassium chloride separates.

The crude cooled mixture is treated with 600 ml. of water. The two phase system is extracted with 4 × 200 ml. ether and backwashed with 100 ml. 2N sodium hydroxide to remove any unreacted phenol. After drying over anhydrous sodium sulfate, the ether is removed on a rotary evaporator. The crude yellow or orange oil is distilled as follows:

| Fraction No. 2 | 158–163°/20 mm | 10.6 g. |
|---|---|---|
| No. 3 | 165–165°/20 mm | 33.5 g. |
| No. 4 | 165°/20 mm | 234.7 g. |

The purity of the distillate can be checked by vpc 10 percent SE-30, 160°

Fraction No. 4 is >99% pure.
No. 3 is >95% pure.
No. 3 and No. 4 can be used in the next step.

Yield 268.2 g. Theor. 530 g. - 53 percent of p-chlorophenoxyacetaldehyde diethyl acetal.

Step B

To 255 ml. (3.3 m) of dry distilled DMF at 0° in a flame dried 3 l 3-neck flask equipped with O-head stirrer, press comp dropping funnel, condenser and drying tube was added 246.9 ml. (2.7 m) POCl$_3$ over 30 to 45 minutes. After completion of the addition, the ice bath was removed and after warming to 25°, stirring was continued for 1 hour. If all the apparatus is very dry, a white crystalline complex forms — otherwise the solution becomes a viscous orange. Then 220.2 g. p-chlorophenoxyacetaldehyde diethyl acetal (0.9 m) was added rapidly over 3 to 5 minutes and the solution stirred 10 minutes at room temperature. The solution was then heated very cautiously on a steam bath. The color changed to a light grey and bubbling began. Heating was stopped and in a few minutes a violent evolution of HCl gas began and the solution turned black. After a few minutes evolution of HCl greatly decreased and the drying tube was replaced on the condenser. The mixture was then heated on a steam bath 5 to 6 hours.

The cooled viscous black oil was poured slowly over crushed ice with considerable heat evolution. After complete addition to the ice, the slurry of ice and black oil was stirred well and neutralized and brought to pH 10 with saturated K$_2$CO$_3$ solution. The pH 10 black oily solution was heated on a steam bath for 2 hours with a solution of 95 percent benzene 5 percent ethanol.

The upper black organic layer was separated and concentrated on the rotary evaporator with no effort to dry the solution. As stripping progressed a brown crystalline solid invariably formed. The bath temperature was raised to 90° and by prolonged pumping, water and residual DMF was completely removed. The crude brown solid was dissolved in chloroform and filtered to remove residual inorganic salts. The chloroform was stripped off and prolonged high vacuum pumping at steam bath temperature for 48 hours gave material showing little or no impurity peaks by nuclear magnetic resonance spectroscopy. Yield 191.4 g. brown granular solid, 2-(p-chlorophenoxy)-3-dimethylaminoacrolein. Theor. 203 g. — 95 percent yield.

Step C

In a 2 l 3-neck flask equipped with O-head stirrer condenser and drying tube was added 500 ml. absolute ethanol. Sodium pellets (23.0 g., 1 m) were added at a safe rate and after completion of reaction 60.0 g. (1 m) of urea was quickly added via a powder funnel. After stirring 10 minutes, the 112.75 g. of 2-(p-chlorophenoxy)-3-dimethylaminoacrolein was added and the stirred solution was heated under reflux from 24 to 48 hours. The reaction solution was cooled to room temperature and poured over 600 ml. of iced water. A clear brown solution resulted. On addition of glacial acetic acid to pH 5, a flocculent brown ppt formed and was collected on a Buchner funnel to give 114 g. of a still wet solid. The nmr of crude material is identical to that of the analytical sample. The best crystallization solvent was 50 percent acetic acid, 50 percent benzene. Crystallization from this solvent gave 53.9 g. of a light brown powdery solid, 5-(p-chlorophenoxy)2-(1H) pyrimidinone (m.p. 220°–221°C.).

| | | | | |
|---|---|---|---|---|
| Calc'd for C: | 53.95; | H, 3.17; | N, 12.58; | Cl, 15.93 |
| Found: | 53.85 | 3.40 | 12.39 | |

This compound exhibited a "percent protection" rating of 92 percent when tested by the procedure of Example III.

EXAMPLE II

Step A

The product was prepared by reaction of 61.0 g. ethyl chloroacetate and 64.0 g. p-chlorophenol (Aldrich) in the presence of sodium ethoxide utilizing known procedures. There was obtained 69.5 g. of white crystalline product, ethyl p-chlorophenoxyacetate: m.p. 49°–51° (lit [1] m.p. 49°); nmr (CDCl$_3$) 1.2 (t, 3H, CH$_3$), 4.2 (q, 2H, CH$_2$), 4.6 (s, 2H, CH$_2$), 6.8 (d, 2H, C$_6$H$_2$), 7.2 (d, 2H, C$_6$H$_2$).

(1) T. M. Minton and M. Stephen, J. Chem. Soc., 121 1600 (1922).

Step B

The product was prepared from 150 ml. ethyl ether, 8.3 g. sodium sand, 69.5 g. ethyl p-chlorophenoxyacetate, and 39.0 g. of methyl formate by literature methods. There was obtained 55.7 g. of fluffy white powder, the sodium salt of ethyl α-(p-chlorophenoxy)-B-hydroxyacrylate.

Step C

The desired product was prepared by heating at reflux for 14 hours in 200 ml. of ethyl alcohol 55.7 g. of the sodium salt of ethyl α-(p-chlorophenoxy)-B-hydroxyacrylate, 23.6 g. thiourea, and 16.6 g. sodium methoxide using known procedures. After evaporation of the solvent, the residue was dissolved in 200 ml. of ice/water, acidified to pH 5.0 with concentrated hydrochloric acid, stirred for 20 minutes, and the precipitate filtered to give 77.6 g. crude product. Recrystallization from chloroform/ethyl alcohol/acetic acid gave 42.0 g. light white micro-crystals of 5-(p-chlorophenoxy)-2-thiouracil: m.p. 286°–287°; nmr (DMSO) 7.1 (d, 2H, C$_6$H$_2$, 7.45 (d, 2H, C$_6$H$_2$), 7.7 (s, 1H, H-6), 12.5 (broad s, 2H, OH, SH).

Step D

The product was prepared by adding 30.0 g Ra/Ni in small portions to a solution of 30 ml. water, 1.2 g. sodium hydroxide, and 3.5 g 5-(p-chlorophenoxy)-2-thiouracil at 60° (oil bath) under nitrogen. The reaction mixture was stirred for 1½ hours at 60°. Then the filtrate obtained by filtering off the Ra/Ni was poured onto ice and acidified to pH 3.0 with concentrated hydrochloric acid. After stirring for 5 minutes the precipitate was filtered, washed with ethyl ether, and air-dried to give 1.5 g. of a white powder, 5-(p-chlorophenoxy)-4-hydroxy-pyrimidine: m.p. 163°–164°; nmr (DMSO) 7.05 (d, 2H, C$_6$H$_2$), 7.5 (d, 2H, C$_6$H$_2$), 8.0 (s, 1H, H-6), 8.2 (s, 1H, H-2), 12.6–13.1 (broad s, 1H, OH).

| | | |
|---|---|---|
| Anal. | Calc'd for C$_{10}$H$_7$ClN$_2$O$_2$: | C, 54.37; H, 3.17; N, 12.59; Cl, 15.92. |
| | Found: | C, 54.21; H, 3.39; N, 12.57; Cl, 15.46. |

This compound exhibited a "percent protection" rating of 92 percent when tested by the method of Example III.

EXAMPLE III

Bronchodilator effects were determined in conscious female Reed-Willet guinea pigs weighing 200–260 g., challenged with histamine. At a preselected interval following oral administration of the test compound or the control saline, a 0.2 percent aqueous solution of histamine dihydrochloride was placed in a commercial nebulizer and sprayed for one minute under an air pressure of 6 lb/in$^2$ in a closed 8 inch × 8 inch × 12 inch plastic container. A guinea pig was immediately placed in the container and its respiratory status scored via the following system: 0-normal breathing; 1-slightly deepened breathing; 2-labored breathing; 3-severely labored breathing; 4-unconscious. The sum of the scores for the treated group was compared with the control sum and a "percent protection" calculated. Eight animals were used per group and all tests were performed in triplicate.

The compounds below were prepared using the method of Example I and were evaluated for bronchodilator effect:

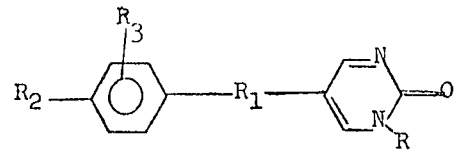

| Compound | R | R$_1$ | R$_2$ | R$_3$ | Melting Point°C. | % Protection |
|---|---|---|---|---|---|---|
| Theophylline | | | | | | 30 |
| 1 | H | O | Br | H | 211.5–212.5° | 90 |
| 2 | CH$_3$ | O | Cl | H | 173–174° | 55 |

-continued

| Compound | R | R₁ | R₂ | R₃ | Melting Point°C. | % Protection |
|---|---|---|---|---|---|---|
| 3 | H | O | Cl | O—Cl | 210–211° | 47 |
| 4 | H | O | H | m—Cl | 177.5–178° | 22 |
| 5 | H | O | H | m—CF₃ | 191–192° | 26 |
| 6 | H | O | H | H | 180–181° | 28 |
| 7 | H | S | Cl | H | 218–220° | 63 |
| 8 | H | O | F | H | 220–221° | 66 |
| 9 | H | O | CH₃ | H | 186.2–187.2° | 58 |

EXAMPLE IV

The compounds below were prepared by the method of Example II and were tested for bronchodilator activity according to the method of Example III.

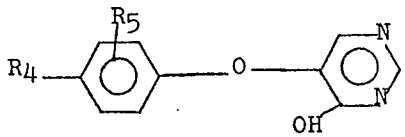

| Compound | R₄ | R₅ | Melting Point °C. | % Protection |
|---|---|---|---|---|
| Theophylline | | | | 30 |
| 1 | Cl | H | 166–167° | 92 |
| 2 | OCH₃ | H | 172–174° | 26 |
| 3 | F | H | 146–147° | 80 |
| 4 | CH₃ | H | 122–124° | 47 |
| 5 | H | H | 189.5–191° | 23 |
| 6 | H | m—CH₃ | 143–145° | 28 |
| 7 | Cl | m—Cl | 165–166° | 45 |

EXAMPLE V

The compounds below were prepared according to the process of Example I and then tested as follows to determine their ability to inhibit gastric acid secretion.

After a 48 hour fast (during which time two sugar cubes and free access to water are allowed), individually caged female rates (100–400 grams) were anesthetized with ether. The abdomen was shaved and through a midline incision the gastro-duodenal region was located. The pyrlorus was ligated, the incision closed, drugs administered, and the animal returned to its cage and allowed to recover from the anesthesia.

Four hours later, the animal was sacrificed by cervical dislocation, the abdomen reopened, the stomach removed and its contents washed into a beaker. The volume of gastric juice was recorded following centrifugation. Excessively dirty (greater than 0.5 ml of solids) or bloody samples were discarded. The acidity of the gastric juice was determined by titration with 0.1N NaOH using phenolthalein as an indicator. Total acid output was calculated and expressed as microequivalents of hydrogen ions/100 grams of body weight/four hours.

Rats were randomly divided into groups of from six to ten each and drugs administered immediately following pylorus ligation either intravenously (tail vein), subcutaneously, or intraduodenally. An appropriate control group was run with every experiment; these animals received vehicle only by the same route and in the same volume as the treated animals.

Results are presented as mean values of acid output ($\mu$Eq H⁺/ 100 g/4 hours) ± one standard deviation, and the differences between the means of the control and treated groups are analyzed using the unpaired t-test.

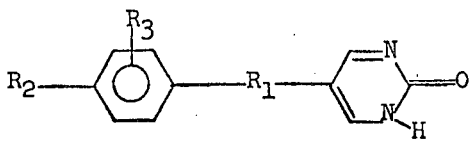

| Compound | R₁ | R₂ | R₃ | Melting Point °C. | % Inhibition 50 mg/kg dose |
|---|---|---|---|---|---|
| 1 | O | Cl | H | 220–221° | −38 |
| 2 | O | Cl | O—Cl | 210–211° | −31 |
| 3 | O | H | m—Cl | 177.5–178° | −58 |
| 4 | O | H | O—Cl | 112–112.8° | −33 |
| 5 | O | CH₃ | H | 186.2–187.2° | −48 |
| 6 | O | H | m—CF₃ | 191–192° | −17* |
| 7 | O | H | H | 180–181° | −69 |
| 8 | O | H | m—CH₃ | 163.7–164.5° | −42 |
| 9 | O | H | O—CH₃ | 208–208.7° | −31 |

*=dose at 12.5 mg/kg

EXAMPLE VI

Step A

Into a 3 1 3-neck flask equipped with a press comp dropping funnel. O-head stirrer, and condenser with solvent takeoff was added 99.1 g (1.5 mol) of 85 percent KOH pellets. The dry flask was heated and to the stirred hot KOH pellets was added 170.0 g (1.5 mol) of meta-cresol. The flask was maintained at such a temperature that the contents were at 90°–100° so that the phenolate anion does not precipitate. A clear solution of molten potassium m-cresolate and water results.

To the stirred molten solution 375 g of chloroacetaldehyde diethylacetal was added (bp 152-6°) at such a rate that the mixture remained at 90° to 100°. The mixture (two phases) was stirred rapidly and heated and an azeotrope of the acetal and water was removed via the takeoff on the condenser. Distillation was continued until the distilling vapor was at 140° to 150°. On cooling, the azeotrope separated into an aqueous and acetal layer and the acetal can be re-added to the reaction mixture. The mixture was stirred vigorously and heated for 6 hours (or overnight) during which time solid potassium chloride separated.

The crude cooled mixture was poured into a stirred solution of ice water and ether. The layers separated and the aqueous layer was washed with two more portions of ether. The combined ether solutions were washed with cold 2N NaOH solution and then dried over anhydrous sodium sulfate, treated with activated charcoal and concentrated on a steam bath to a mobile amber oil weighing 424 g. The residual traces of ether are removed by distillation at atmospheric pressure and then excess chloroacetaldehyde diethylacetal was removed by distillation at water aspirator pressure (20 mm). Final distillation under high vacuum at 0.2 to 0.3 mm Hg at 90°–95° gave 291.7 g of m-methylphenoxyacetaldehyde diethyl acetal as a clear colorless oil.

| Anal. | Calc'd for $C_{13}H_{20}O_3$: | C, 69.61; H, 8.99. |
|---|---|---|
| | Found: | C, 69.80; H, 8.84. |

Step B

To 131.6 g (1.8 mol) of dry DMF in a 2 liter round bottom flask was slowly added 276.0 g (1.8 mol) of phosphorous oxychloride. During the addition the temperature was maintained at 25°C. by cooling with an external ice bath. After addition of 150 ml of $CHCl_3$ the solution was heated at reflux and 134.6 g (0.6 mol) of m-methylphenoxyacetaldehyde diethyl acetal was added and reflux continued for 2 hours. The reaction solution was cooled and poured onto a large volume of ice and the pH adjusted to 10 to 11 with sodium hydroxide pellets. After 15 min. stirring at 20°, 600 ml. of 40 percent aqueous dimethylamine solution was added and the well stirred mixture was gently heated on a steam bath for 1 hour. After cooling the layers were separated and the aqueous layer was washed with chloroform. The combined chloroform solutions were dried over anhydrous sodium sulfate, filtered and concentrated under vacuum to an amber oil which soon solidified. Trituration of the solid with isopropyl ether and filtration gave 99 g of tan crystals m.p. 99°–100°. An analytical sample of 2-(m-methylphenoxy)-3-dimethylaminoacrolein m.p. 103°–4.5° was prepared by crystallization from ethyl acetate-hexane.

| Anal. Calc'd for $C_{12}H_{15}O_2N$: | C, 70.22; H, 7.35; N, 6.82. |
|---|---|
| Found: | C, 70.38; H, 7.41; N, 6.74. |

Step C

To a solution of sodium ethoxide, 0.14 mol (prepared from 3.22 g of sodium pellets) and 28.7 g (0.14 mol) of 2-(m-methylphenoxy)-3-dimethylaminoacrolein in 90 ml. of dry dimethylsulfoxide was added 42.0 g (0.7 mol) urea and the mixture was stirred at 25° for 5 hours. 200 ml. of water was added and the solution was heated on a steam bath for 1 hour. On cooling, a solid crystallized and was collected by filtration and was washed with a small amount of water followed by ethylacetate and then ether to give after air and oven drying 17.8 g of white crystalline sodium salt. The solid was dissolved in a boiling solution of 300 ml water and 100 ml methanol. Acidification with 6N hydrochloric acid to pH 3 followed by cooling caused a solid to precipitate. Filtration, air and oven drying gave 14.3 g 5-(m-methylphenoxy)-2(1H)pyrimidinone as a white crystalline solid m.p. 158°–9°.

| Anal. Calc'd for $C_{11}H_{10}O_2N_2$: | C, 65.33; H, 4.98; N, 13.86. |
|---|---|
| Found: | C, 65.39; H, 5.08; N, 13.87. |

In order to test the anti-ulcer activity of the above compounds and other compounds stress-induced gastric ulceration was produced by immobilizing non-fasted, female rats in a supine position and placing them in a refrigerator at 12°C. for 3 hours. Experimental drugs were administered three hours before the initiation of the cold-restraint stress period. At the conclusion of the stress period, the rats were sacrificed, their stomachs inflated with 5 ml of water and removed. The isolated stomachs were placed in a 4 percent aqueous solution of formaldehyde to stiffen the serosal side of the inflated stomach. This procedure facilitates examination of the stomach which is accomplished by slitting the stomach along its greater curvature and noting the number and incidence of gastric lesions. Both control and experimental drug groups consisted of ten rats. A significant reduction in the number and incidence of gastric lesions characterizes antiulcer agents.

The table below compares 5-(m-methylphenoxy)-2(1H)pyrimidinone (Compound A) and 4-hydroxy-5-(m-methylphenylthio)pyrimidine (Compound B).

| Compound | Dosage P.O. | Percent Reduction in gastric lesions | |
|---|---|---|---|
| | | Total Number | Incidence |
| Compound A | 10 mg/kg | 71 | 30 |
| | 32 mg/kg | 63 | 50 |
| Compound B | 32 mg/kg | 0 | 0 |

We claim:
1. A compound of the formula:

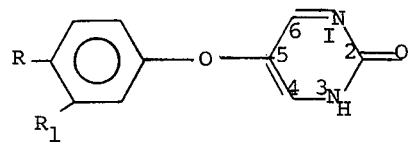

and the pharmaceutically acceptable acid addition, non-toxic metal, ammonium and substituted ammonium salts thereof wherein:

R and $R_1$ are each hydrogen or methyl with the proviso that at least one of R and $R_1$ be hydrogen.

2. The method of treating peptic ulcer which comprises administering to a subject afflicted therewith a daily dose of a compound of claim 1 equivalent to about .60 to 21 mg of said compound per kg. body weight.

3. 5-(m-methylphenoxy)-2-(1H) pyrimidinone, a compound according to claim 1.

4. 5-(p-methylphenoxy)-2-(1H)pyrimidinone, a compound according to claim 1.

5. 5-phenoxy-2-(1H)pyrimidinone, a compound according to claim 1.

* * * * *